US009566767B2

United States Patent
Suzuki et al.

(10) Patent No.: US 9,566,767 B2
(45) Date of Patent: Feb. 14, 2017

(54) RESIN-RUBBER COMPOSITE

(71) Applicant: NOK Corporation, Tokyo (JP)

(72) Inventors: Akihiro Suzuki, Kanagawa (JP); Kiyofumi Fukasawa, Kanagawa (JP)

(73) Assignee: NOK Corporation, Tokyo (JP)

(*) Notice: Subject to any disclaimer, the term of this patent is extended or adjusted under 35 U.S.C. 154(b) by 6 days.

(21) Appl. No.: 14/437,267

(22) PCT Filed: Oct. 4, 2013

(86) PCT No.: PCT/JP2013/077076
§ 371 (c)(1),
(2) Date: Apr. 21, 2015

(87) PCT Pub. No.: WO2014/065098
PCT Pub. Date: May 1, 2014

(65) Prior Publication Data
US 2015/0251386 A1    Sep. 10, 2015

(30) Foreign Application Priority Data

Oct. 22, 2012   (JP) ................. 2012-232540

(51) Int. Cl.
| B32B 7/10 | (2006.01) |
| B32B 25/08 | (2006.01) |
| B32B 25/14 | (2006.01) |
| B32B 27/16 | (2006.01) |
| B32B 27/34 | (2006.01) |
| B32B 1/08 | (2006.01) |
| C08J 7/12 | (2006.01) |
| B32B 25/20 | (2006.01) |
| C08J 7/04 | (2006.01) |

(52) U.S. Cl.
CPC ............... B32B 25/08 (2013.01); B32B 25/14 (2013.01); B32B 25/20 (2013.01); B32B 27/16 (2013.01); B32B 27/34 (2013.01); C08J 7/047 (2013.01); C08J 7/123 (2013.01); B32B 1/08 (2013.01); B32B 7/10 (2013.01); B32B 2250/02 (2013.01); B32B 2250/24 (2013.01); B32B 2310/14 (2013.01); B32B 2605/00 (2013.01); C08J 2377/02 (2013.01); C08J 2377/06 (2013.01); C08J 2427/16 (2013.01); Y10T 428/31544 (2015.04)

(58) Field of Classification Search
None
See application file for complete search history.

(56) References Cited

U.S. PATENT DOCUMENTS

| 5,554,425 A | 9/1996 | Krause et al. |
| 5,707,701 A | 1/1998 | Saitoh et al. |
| 6,162,385 A | 12/2000 | Grosse-Puppendahl et al. |
| 2003/0087053 A1* | 5/2003 | Fukushi .............. B32B 1/08 428/36.91 |
| 2003/0099799 A1 | 5/2003 | Koike et al. |
| 2005/0281973 A1 | 12/2005 | Park |
| 2006/0004126 A1 | 1/2006 | Park et al. |
| 2006/0292387 A1 | 12/2006 | Kuhmann et al. |
| 2009/0169787 A1 | 7/2009 | Shinoda et al. |
| 2010/0065195 A1 | 3/2010 | Lehtonen |

FOREIGN PATENT DOCUMENTS

| CN | 101218082 A | 7/2008 |
| JP | 7-80996 | 3/1995 |
| JP | 8-72203 | 3/1996 |
| JP | 2006-205732 A | 8/2006 |
| JP | 2008-230244 | 10/2008 |
| JP | 2009-154467 A | 7/2009 |
| WO | WO 01/65161 A1 | 9/2007 |

OTHER PUBLICATIONS

International Search Report from corresponding PCT application No. PCT/JP2013/077076 dated Jan. 7, 2014 (3 pgs).
International Preliminary Report on Patentability and Written Opinion from corresponding PCT application No. PCT/JP203/077076 dated May 7, 2015 (6 pgs).

* cited by examiner

Primary Examiner — Ramsey Zacharia
(74) Attorney, Agent, or Firm — Brinks Gilson & Lione

(57) ABSTRACT

A resin-rubber composite in which a low-pressure plasma-treated polyamide-based resin-molded product and a polyol-vulcanizable fluororubber composition that forms a fluororubber layer are directly bonded by vulcanization without interposing an adhesive. The low-pressure plasma treatment of the polyamide-based resin-molded product is performed in the presence of an inert gas, such as He gas, Ar gas, or $N_2$ gas, at a pressure of 10 to 1,000 Pa. Here, an alkoxysilane compound is an optional component in the fluororubber composition, and the presence or absence of this compound does not affect the adhesion.

3 Claims, No Drawings

RESIN-RUBBER COMPOSITE

RELATED APPLICATION

This application is a 35 U.S.C. §371 national phase filing of International Patent Application No. PCT/JP2013/077076, filed Oct. 4, 2013, through which and to which priority is claimed under 35 U.S.C. §119 to Japanese Patent Application No. 2012-232540, filed Oct. 22, 2012, the entire disclosure of which is hereby expressly incorporated by reference.

TECHNICAL FIELD

The present invention relates to a resin-rubber composite. More particularly, the present invention relates to a resin-rubber composite in which a polyamide-based resin-molded product and fluororubber are directly bonded without interposing an adhesive.

BACKGROUND ART

Combining polyamide-based resin-molded products and fluororubber into composites is generally performed by a method using an adhesive. However, the adhesion method using an adhesive has problems not only in that the process is complicated, requiring complicated process management and causing high costs, but also in that it is necessary to use large amounts of environmentally hazardous substances, such as organic solvents.

Patent Document 1 discloses a resin-rubber laminate in which a polyamide resin that has been subjected to plasma treatment, corona discharge treatment, or ultraviolet irradiation treatment, and a rubber composition containing an alkoxysilane compound of the following formula:

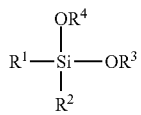

$R^1$, $R^2$: any functional groups
$R^3$, $R^4$: hydrocarbon groups
are laminated without interposing an adhesive and bonded. However, although fluororubber is mentioned as an example of the rubber to which an alkoxysilane compound is added, no Examples using fluororubber are provided.

Patent Document 2 discloses a method for combining a polyamide-based resin-molded product and a member comprising other molding materials into a composite without using an adhesive, wherein at least one of these components is treated with an open air plasma on their contact surface prior to the production of the composite, and the other part is then integrally molded.

Here, vulcanized polymer compounds, such as a fluoropolymer compound, are mentioned as examples of the other molding materials; however, such compounds are molding members (e.g., injection molding member, extrudate, compression molding member), or semifinished products (e.g., single- or multilayer films, textile structures, etc.), and it is not described that the compounds are unvulcanized rubber compounds.

Moreover, Patent Document 3 discloses a fuel hose comprising an inner resin layer and an outer rubber layer laminated on the outer periphery of the inner resin layer, wherein after the inner resin layer made of a polyamide-based resin, fluororesin, or the like is formed by extrusion-molding, and before the outer rubber layer is extrusion-molded, the peripheral surface of the inner resin layer is subjected to microwave plasma treatment under reduced pressure. However, fluororubber is only mentioned as an example of the extrusion molding rubber forming the outer rubber layer.

PRIOR ART DOCUMENTS

Patent Documents

Patent Document 1: JP-A-8-72203
Patent Document 2: JP-A-2006-205732
Patent Document 3: JP-A-2008-230244

OUTLINE OF THE INVENTION

Problem to be Solved by the Invention

An object of the present invention is to provide a resin-rubber composite in which a polyamide-based resin-molded product and fluororubber are effectively directly bonded without interposing an adhesive.

Means for Solving the Problem

Such an object of the present invention is achieved by a resin-rubber composite in which a low-pressure plasma-treated polyamide-based resin-molded product and a polyol-vulcanizable fluororubber composition that forms a fluororubber layer are directly bonded by vulcanization without interposing an adhesive Effect of the Invention The resin-rubber composite of the present invention has the following features:

(1) The plasma treatment of a polyamide-based resin-molded product is performed by a low-pressure plasma treatment method. When the plasma treatment is performed by an atmospheric pressure plasma treatment method, desired adhesion between the resin and the rubber cannot be ensured.

(2) As shown in Comparative Example 5, provided later, when polyphenylene sulfide, which is exemplified together with a polyamide resin in paragraph [0030] of Patent Document 3, is used in place of the polyamide-based resin, no adhesion between the resin and the fluororubber can be obtained.

(3) Polyol-vulcanizable fluororubber is used as the fluororubber to be vulcanization-bonded to the surface of a polyamide-based resin-molded product. When fluororubber containing other crosslinkable group, i.e., peroxide-crosslinkable fluororubber, is used, a certain level of adhesive strength is obtained in an adhesion test, as shown in Comparative Examples 1 and 2, provided later; however, the rubber remaining ratio is 0% in any cases.

(4) An alkoxysilane compound, which is used as an essential component in the fluororubber composition of Patent Document 1, is an optional component in the present invention, and the presence or absence of this compound does not affect the adhesion.

EMBODIMENTS FOR CARRYING OUT THE INVENTION

Examples of the type of typical polyamides (PA) used as the polyamide-based resin to be treated with low-pressure plasma, and their monomers are as follows:

| Type | Number of $CH_2$/NHCO groups | Starting material monomer |
|---|---|---|
| 46 | 4 | Tetramethylenediamine-adipate |
| 6 | 5 | ε-Caprolactam, ε-aminocaproic acid |
| 66 | 5 | Hexamethylenediamine-adipate |
| 610 | 7 | Hexamethylenediamine-sebacate |
| 612 | 8 | Hexamethylenediamine-dodecanoic diacid salt |
| 11 | 10 | ω-Aminoundecanoic acid |
| 12 | 11 | ω-Laurolactam, ω-aminododecanoic acid |

In addition to these polyamides, PA613, 3T, PA810, PA812, PA1010, PA1012, PA1212, PAPACM12, etc., can also be used. These polyamide-based resins are used singly or in combination. Further, they can be used in blending with other resins, such as polypropylene, within the range that does not impair the object. Moreover, polyamide-based resins containing fillers, such as glass fibers, for ensuring resin physical properties can also be used.

Furthermore, molded products of these polyamide-based resins have a shape that allows vulcanization bonding and lamination of fluororubber to obtain composites. Examples of the shape include a plate shape, a rod shape, a hollow shape, etc., having a flat surface, a curved surface, an irregular surface, or the like. Specific applications thereof include hoses, anti-vibration rubber, and air springs, as well as elements of fuel guiding systems, cooling fluid guiding systems, oil guiding systems, and the like.

The outer surface of these polyamide-based resin-molded products is treated with low-pressure plasma. Low-pressure plasma treatment is performed in a glass vacuum vessel equipped with two parallel plate electrodes in an atmosphere of an inert gas, such as He gas, Ne gas, Ar gas, Kr gas, Xe gas, or $N_2$ gas, preferably He gas, Ar gas, or $N_2$ gas, which are used singly or in a mixture, at a pressure of about 10 to 1,000 Pa using a high-frequency power source having a frequency of 40 kHz or 13.56 MHz, or a microwave power source having a frequency of 433 MHz to 2.45 GHz, at an output of about 10 to 1,000 W for about 0.1 to 60 minutes.

The fluororubber used in the present invention is polyol-vulcanizable fluororubber. The fluororubber to be vulcanized by a polyol vulcanizing system is a highly fluorinated elastomeric copolymer. For example, copolymers of vinylidene fluoride and other fluorine-containing olefins can be used. Specific examples thereof include copolymers of vinylidene fluoride and one or more of hexafluoropropylene, pentafluoropropylene, trifluoroethylene, trifluorochloroethylene, tetrafluoroethylene, vinyl fluoride, perfluoroacrylic acid ester, perfluoroalkyl acrylate, perfluoro(methyl vinyl ether), perfluoro(ethyl vinyl ether), perfluoro(propyl vinyl ether), and the like; preferably used are vinylidene fluoride-hexafluoropropylene copolymers and vinylidene fluoride-tetrafluoroethylene-hexafluoropropylene terpolymers.

For example, at least one of the following commercial products is practically used as it is:

Viton E45 (vinylidene fluoride-hexafluoropropylene copolymer) and Viton A-200 (Mooney viscosity: 20; vinylidene fluoride-hexafluoropropylene copolymer; F content: 66%), produced by DuPont;

Tecnoflon N60HS (Mooney viscosity: 28; vinylidene fluoride-hexafluoropropylene copolymer, F content: 66%), produced by Solvay Solexis;

FC-2120 (Mooney viscosity: 23), FC-2122 (Mooney viscosity: 25), FC-2123 (Mooney viscosity: 25), FC-2170 (Mooney viscosity: 31), FC-2174 (Mooney viscosity: 40), FC-2176 (Mooney viscosity: 30), FC-2177 (Mooney viscosity: 33), FC-3009 (Mooney viscosity: 30), FE-5620Q (Mooney viscosity: 23), FE-5621 (Mooney viscosity: 23), and FE-5641Q (Mooney viscosity: 40) <vinylidene fluoride-hexafluoropropylene copolymers, F content: 65.9%>; FLS-2530 (Mooney viscosity: 38) <Vinylidene fluoride-hexafluoropropylene copolymer, F content: 69.0%>; and FE-5840Q (Mooney viscosity: 37) <vinylidene fluoride-hexafluoropropylene-tetrafluoroethylene terpolymer, F content: 70.1%>; produced by Dyneon.

Further, a polyhydroxy aromatic compound is used as a vulcanizing agent for the fluororubber. Examples of polyhydroxy aromatic compounds include 2,2-bis(4-hydroxyphenyl)propane [bisphenol A], 2,2-bis(4-hydroxyphenyl)perfluoropropane [bisphenol AF], hydroquinone, catechol, resorcin, 4,4'-dihydroxydiphenyl, 4,4'-dihydroxydiphenylmethane, 4,4'-dihydroxydiphenylsulfone, 2,2-bis(4-hydroxyphenyl)butane, and the like; preferably used are bisphenol A, bisphenol AF, hydroquinone, and the like. These may be in the form of alkali metal salts or alkaline earth metal salts. Such a vulcanizing agent is used at a ratio of about 0.5 to 10 parts by weight, preferably about 0.5 to 6 parts by weight, based on 100 parts by weight of the fluororubber. When the ratio of the vulcanizing agent used is less than this range, crosslinking density is insufficient. In contrast, when the ratio is greater than this range, crosslinking density is overly high, and rubber-like elasticity tends to be lost.

It is preferable to use an acid acceptor in the vulcanization of polyol-vulcanizable fluororubber. Examples of acid acceptors include oxides or hydroxides of divalent metals, such as oxides or hydroxides of magnesium, calcium, barium, lead, or zinc; hydrotalcite-related analogous compounds; and the like. The acid acceptor is used at a ratio of about 1 to 20 parts by weight, preferably about 3 to 6 parts by weight, based on 100 parts by weight of the fluororubber.

Furthermore, a vulcanization accelerator, such as a quaternary onium salt (quaternary ammonium salt or quaternary phosphonium salt), an N-alkyl-substituted amide compound, an active hydrogen-containing aromatic compound-quaternary phosphonium salt equimolecular compound, a divalent metal amine complex compound, or the like, can also be used at a ratio of about 10 parts by weight or less, preferably about 0.1 to 5 parts by weight, based on 100 parts by weight of the fluororubber.

The fluororubber composition comprising the above components as essential components may further contain, if necessary, a reinforcing agent typified by carbon black, an antioxidant, a plasticizer, a processing aid, a vulcanization aid, etc. These components are kneaded by using a closed-type kneader, open roll, or the like.

The composition may further contain alkoxysilane, such as one described in Patent Document 1 above, at a ratio of about 5 parts by weight or less, preferably about 0.05 to 1 part by weight, based on 100 parts by weight of the polyol-vulcanizable fluororubber.

Examples of alkoxysilane compounds include tetramethoxysilane, tetraethoxysilane, methyltriethoxysilane, vinyltrimethoxysilane, γ-chloropropyltrimethoxysilane, γ-mercaptopropyltrimethoxysilane, γ-methacryloxypropyltrimethoxysilane, γ-glycidoxypropyltrimethoxysilane, γ-aminopropyltriethoxysilane, γ-aminopropyltrimethoxysilane, γ-(2-amino ethyl)-aminopropyltrimethoxysilane, γ-(2-aminoethyl)-aminopropylmethyldimethoxysilane, γ-anilinopropyltrimethoxysilane, γ-ureidopropyltriethoxysilane, N-β-(N-vinylbenzylaminoethyl)-γ-aminopropyltrimethoxysilane, and the like. Preferred among these are those containing an amino group as a functional group, such as γ-aminopropyltriethoxysilane, γ-aminopropyltrimethoxysilane, γ-(2-amino ethyl)-aminopropyltrimethoxysilane, γ-(2-aminoethyl)-aminopropylmethyldimethoxysilane, γ-anilinopropyltrimethoxysilane, γ-ureidopropyltriethoxysilane, and N-β-(N-vinylbenzylaminoethyl)-γ-aminopropyltrimethoxysilane.

Vulcanization bonding of polyol-crosslinkable fluororubber to a polyamide-based resin-molded product is performed by banding an unvulcanized fluororubber composition kneaded product to a polyamide-based resin-molded product, followed by molding by a vulcanization molding method, such as injection molding, compression molding, or transfer molding, at about 150 to 200° C. for about 0.5 to 60 minutes.

EXAMPLES

The following describes the present invention with reference to Examples.

Example 1

A PA66 resin (Amilan CM3001-G30, produced by Toray Industries, Inc.) was used as a polyamide-based resin, and molded into a plate shape (25×60×2 mm) using an injection molding machine. The obtained PA66 resin plate was treated with low-pressure plasma in a glass vacuum vessel equipped with aluminum parallel plates under helium gas atmosphere at a pressure of about 60 Pa under the following conditions: frequency: 40 kHz, output: 200 W, and time: 10 minutes.

Subsequently, a kneaded product of an unvulcanized fluororubber composition having the following formulation was bonded to the low-pressure plasma-treated PA66 resin plate, followed by pressure vulcanization at 180° C. for 6 minutes, thereby obtaining a polyamide-based resin-fluororubber composite.

| [Fluororubber Composition I] | |
|---|---|
| Fluororubber (Viton E45) | 100 parts by weight |
| Calcium metasilicate (produced by NYCO Minerals) | 40 parts by weight |
| MT carbon black (produced by Cancarb Limited) | 20 parts by weight |
| Magnesium oxide (Magnesia #150, produced by Kyowa Chemical Industry Co., Ltd.) | 6 parts by weight |
| Calcium hydroxide (produced by Ohmi Chemical Industry Co., Ltd.) | 3 parts by weight |
| γ-Aminopropyltriethoxysilane (produced by Dow Corning Toray Silicone Co., Ltd.) | 0.5 parts by weight |
| Polyol-based vulcanizing agent (Curative #30, produced by DuPont) | 2 parts by weight |
| Quaternary onium salt vulcanization accelerator (Curative #20, produced by DuPont) | 1 part by weight |

The obtained polyamide-based resin-fluororubber composite was measured for the adhesive strength and rubber-remaining area ratio by a 90-degree peel test according to JIS K6256 (2006) corresponding to ISO 813. As a result, the adhesive strength was 5.8 (N/mm), and the rubber-remaining area ratio was 100%.

Example 2

In Example 1, a fluororubber composition that did not contain γ-aminopropyltriethoxysilane was used. The adhesive strength of the obtained polyamide-based resin-fluororubber composite was 5.9 (N/mm), and the rubber-remaining area ratio was 100%.

Example 3

In Example 1, a PA46 resin (Stanyl TW241F6, produced by DSM Corporation) was used as the polyamide-based resin in place of the PA66 resin. The adhesive strength of the obtained polyamide-based resin-fluororubber composite was 5.7 (N/mm), and the rubber-remaining area ratio was 100%.

Example 4

In Example 2, a PA46 resin (Stanyl TW241F6) was used as the polyamide-based resin in place of the PA66 resin. The adhesive strength of the obtained polyamide-based resin-fluororubber composite was 5.7 (N/mm), and the rubber-remaining area ratio was 100%.

Comparative Example 1

In Example 1, fluororubber composition having the following formulation was used.

| [Fluororubber Composition II] | |
|---|---|
| Fluororubber (Daiel G901, produced by Daikin Industries, Ltd.; Peroxide-crosslinkable vinylidene fluoride-hexafluoropropylene-tetrafluoroethylene terpolymer) | 100 parts by weight |
| MT carbon black (produced by Cancarb Limited) | 20 parts by weight |
| Magnesium oxide (Magnesia #150, produced by Kyowa Chemical Industry Co., Ltd.) | 6 parts by weight |
| Calcium hydroxide (produced by Ohmi Chemical Industry Co., Ltd.) | 3 parts by weight |
| γ-Aminopropyltriethoxysilane (produced by Dow Corning Toray Silicone (Co., Ltd.) | 0.5 parts by weight |
| Triallyl isocyanurate (produced by Nippon Kasei Chemical Co., Ltd.) | 1.8 parts by weight |
| Organic peroxide (Perhexa 25B, produced by NOF Corporation) | 0.8 parts by weight |

The adhesive strength of the obtained polyamide-based resin-fluororubber composite was 2.5 (N/mm), and the rubber-remaining area ratio was 0%.

Comparative Example 2

In Comparative Example 1, the same amount of a PA46 resin (Stanyl TW241F6) was used as the polyamide-based resin in place of the PA66 resin. The adhesive strength of the obtained polyamide-based resin-fluororubber composite was 2.1 (N/mm), and the rubber-remaining area ratio was 0%.

Comparative Example 3

In Example 2, a PA66 resin that was not treated with low-pressure plasma was used as the plate molded material.

The adhesive strength of the obtained polyamide-based resin-fluororubber composite was 0.1 (N/mm), and the rubber-remaining area ratio was 0%.

Comparative Example 4

In Example 2, a PA66 resin plate that was treated with atmospheric pressure plasma using helium gas as process gas in a distance between the resin plate and the plasma nozzle of 15 mm at a processing speed of 100 mm/sec was used in place of the low-pressure plasma-treated PA66 resin plate. The adhesive strength of the obtained polyamide-based resin-fluororubber composite was 0.9 (N/mm), and the rubber-remaining area ratio was 0%.

Comparative Example 5

In Example 2, a polyphenylene sulfide resin (Susteel PPS GS-30, produced by Tosoh Corporation) was used as the resin in place of the PA66 resin. The adhesive strength of the obtained polyphenylene sulfide resin-fluororubber composite was 0 (N/mm), and the rubber-remaining area ratio was 0%.

Comparative Example 6

In Comparative Example 1, a fluororubber composition that did not contain γ-aminopropyltriethoxysilane was used. The adhesive strength of the obtained polyamide-based resin-fluororubber composite was 2.6 (N/mm), and the rubber-remaining area ratio was 0%.

INDUSTRIAL APPLICABILITY

The polyamide-based resin-fluororubber composite of the present invention can be effectively used for drum seals, automobile parts such as side cover seals for transmissions, anti-vibration rubber, resin rubber laminate hoses, and the like.

The invention claimed is:

1. A resin-rubber composite in which a low-pressure plasma-treated polyamide-based resin-molded product and a polyol-vulcanizable fluororubber composition that forms a fluororubber layer are directly bonded by vulcanization without interposing an adhesive, wherein the bonding of the fluororubber layer to the resin-molded product is effected without requiring an alkoxysilane compound.

2. The resin-rubber composite according to claim 1, wherein the low-pressure plasma treatment of the polyamide-based resin-molded product is performed in the presence of an inert gas at a pressure of 10 to 1,000 Pa.

3. The resin-rubber composite according to claim 2, wherein the inert gas is helium gas, argon gas, nitrogen gas, or a mixture thereof.

* * * * *